United States Patent [19]
Rainey et al.

[11] Patent Number: 5,799,315
[45] Date of Patent: Aug. 25, 1998

[54] METHOD AND APPARATUS FOR EVENT-TAGGING DATA FILES AUTOMATICALLY CORRELATED WITH A TIME OF OCCURENCE IN A COMPUTER SYSTEM

[75] Inventors: Matthew Rainey, Palo Alto; Luigi Alberto Pio-di Savoia, Mountain View, both of Calif.

[73] Assignee: Sun Microsystems, Inc., Palo Alto, Calif.

[21] Appl. No.: 499,586

[22] Filed: Jul. 7, 1995

[51] Int. Cl.⁶ .................................................. G06F 17/30
[52] U.S. Cl. ................................................. 707/104; 707/101
[58] Field of Search ................................... 395/137, 141, 395/161, 159, 558; 364/419.13, 551.01; 382/203; 368/185; 707/104, 1, 3, 101; 342/125; 345/441

[56] References Cited

U.S. PATENT DOCUMENTS

| | | | |
|---|---|---|---|
| 4,068,298 | 1/1978 | Dechant et al. | 707/3 |
| 4,545,029 | 10/1985 | Collier | 395/558 |
| 5,345,543 | 9/1994 | Capps et al. | 395/137 |
| 5,404,442 | 4/1995 | Foster et al. | 395/159 |
| 5,434,777 | 7/1995 | Luciw | 364/419.13 |
| 5,465,325 | 11/1995 | Capps et al. | 395/141 |
| 5,483,651 | 1/1996 | Adams et al. | 707/1 |
| 5,487,054 | 1/1996 | Capps et al. | 368/185 |
| 5,515,056 | 5/1996 | Henderson et al. | 342/125 |
| 5,524,201 | 6/1996 | Shwarts et al. | 395/161 |
| 5,544,265 | 8/1996 | Bozinovic et al. | 382/203 |
| 5,619,694 | 4/1997 | Shimazu | 707/104 |
| 5,630,041 | 5/1997 | Mills et al. | 345/441 |
| 5,682,330 | 10/1997 | Seaman et al. | 364/551.01 |

FOREIGN PATENT DOCUMENTS

| | | | |
|---|---|---|---|
| 0 495 622 A2 | 7/1992 | European Pat. Off. | G06F 15/401 |
| 0 495 622 A3 | 7/1992 | European Pat. Off. | G06F 15/401 |
| 0 550 197 A2 | 7/1993 | European Pat. Off. | G06F 9/46 |
| 0 550 197 A3 | 7/1993 | European Pat. Off. | G06F 9/46 |
| 0 660 249 A1 | 6/1995 | European Pat. Off. | G06F 17/30 |
| WO91/13393 | 9/1991 | WIPO | G06F 3/33 |
| WO94/27236 | 11/1994 | WIPO | G06F 15/403 |

*Primary Examiner*—Thomas G. Black
*Assistant Examiner*—Frantz Coby
*Attorney, Agent, or Firm*—Matthew C. Rainey

[57] ABSTRACT

A method and apparatus for event-tagging data entries as separate data segments in a data file. The data file is stored in the memory of a computer including a processor that executes instructions to carry out the method of the invention. As a user enters data, such as with a computer "pen" in a pen-driven notebook computer, the processor determines whether each data entry is one of a set of predefined data entry events. Such events may include areas on the screen that the user is entering his or her notes, such lines or paragraphs, such that whenever the user begins a new line or paragraph, that is tagged as a new event. An event may also be a particular time interval; for instance, data entry may be tagged every minute, or every ten minutes. An event may also relate to the type of data that the user is entering, such as graphical data vis-a-vis handwritten or text data, and/or may relate to the fact that a given data entry is of a different type of data than an adjacent data entry. The event-tagged segments are used to synchronize display of the data segments with a series of event signals, for instance to play back the development of the document comprising the data file in synchrony with the playback of a videotape of the meeting or other event at which the notes and/or drawings were made. Conversely, the event signals may be used to drive the videotape player or another external device. The event tagging of the data file also provides a useful mechanism for reconciling different versions of the data file on a segment-by-segment basis.

25 Claims, 12 Drawing Sheets

METHOD AND APPARATUS FOR EVENT-TAGGING DATA FILES AUTOMATICALLY CORRELATED WITH A TIME OF OCCURENCE IN A COMPUTER SYSTEM

BACKGROUND OF THE INVENTION

The present invention relates to the reconciling of different versions of documents stored by a computer system, and to the correlating of notes taken on a notebook computer with real-time events.

Notebook computers, i.e. hand- or lap-held computers on which one can enter data, are becoming ever more prevalent. The data may be entered in the form of typewritten or handwritten words, the latter conventionally being done with a computer "pen" onto a screen or pad which is sensitive to the position of the pen. Graphics may also be input by such a pen.

When reviewing notes that one has taken from a meeting, it can be difficult to find relevant sections of the notes at a later time. This is especially the case where the meeting has gone on for a long period of time, such as over a day or series of days (e.g. at a conference). Thus, there is a need to correlate such notes and drawings made during meetings with real-time events, including with the times and dates that the notes were actually entered.

Typically, the notes that one enters into a notebook computer are "dead" documents, i.e. simply bitmapped snapshots of the note-taker's thoughts, and there is no convenient way of linking the time that the notes were taken with the notes themselves. When reviewing many pages of notes, it would be quite useful to have a system that would provide information about the time that the notes were taken, and even about the timewise evolution of the notes—i.e., the times at which earlier notes have been modified at a later time.

This would be particularly useful if the person reviewing the notes also has a videotape (or a time-tagged transcript of a video); he/she could use the time-tagging of the electronic notes to easily find the relevant portion of the video.

When two people both make revisions to a data file, the problem of reconciling the now-different versions of the file is presented. A solution to this problem is needed, particularly where the two versions may have had changes made over a period of time, and records have not been kept of the actual times of modification by the respective users of the file.

There are currently certain processes used for storing time information for documents, i.e. for storing creation and modification times of documents in UNIX and other systems. However, no known system tracks the evolution of documents at a resolution higher than those two factors, or is geared to the time-tagging of handwritten electronic notes.

SUMMARY OF THE INVENTION

The present invention is directed to a method and apparatus for event-tagging data entered into a computer system. As a user enters information into, for instance, a notebook computer, the computer detects whether each data entry constitutes one of a set of predefined "events", i.e. particular types of data entry occurrences that should be specially tagged as the data are stored. Such events may include: the beginning of a new line of text (whether handwritten with a computer "pen" or typed); the beginning of a new paragraph; the passage of some predetermined amount of time; the entry of graphical objects into a text document; and so on.

The stored data file thus includes a series of event-tagged data segments, which can later be accessed, displayed and modified on a segment-by-segment basis. For instance, if the data file consists of a handwritten series of notes on a pen-driven notebook computer and the event tagging includes time-tagging or time-stamping the notes, then they may be displayed along with their time stamps, thus providing an easy review of when each portion of the notes was entered. In addition, the data segments may be displayed in a sequential fashion, mimicking their entry, to provide the user with a view of the development of the data. This is especially useful when viewing graphics, which contain a lot of information in the way they are drawn.

Data segments may also be displayed in response to a synchronizing signal from an external device, such as a video cassette player, allowing the user to view the development of notes and drawings in synchrony with the playback of a videotape of a meeting.

The event-tagging of data segments also provides a useful vehicle for reconciling different versions of the document after it has been revised. The individual segments in an original data file and in a modified version of the data file are compared, and their differences can be displayed, or both versions of the document may be displayed, on a segment by-segment basis.

DESCRIPTION OF THE PREFERRED EMBODIMENTS

Figure 1:
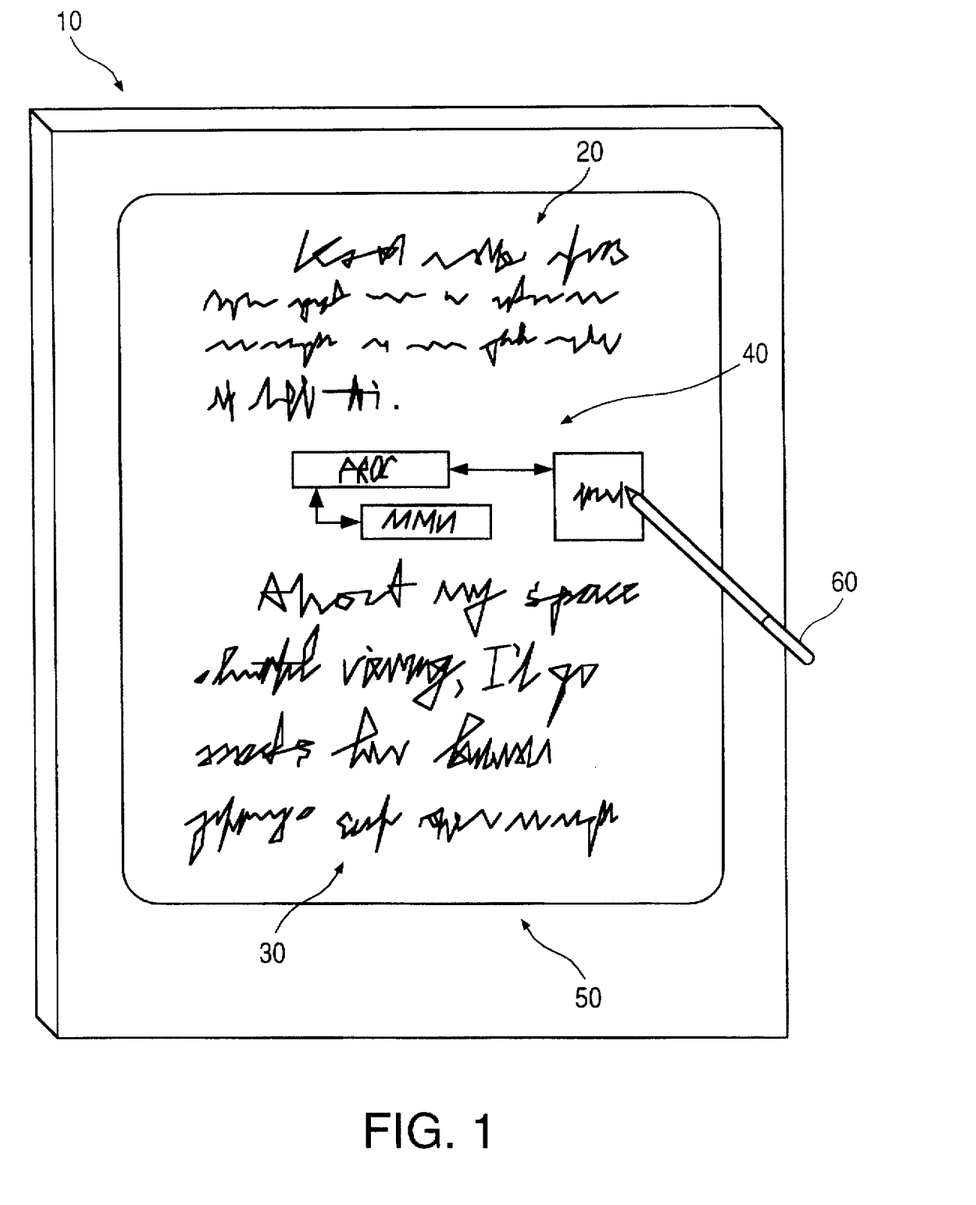
FIG. 1 is an illustration of the process of entering notes and graphics on a pen based notebook computer.

In FIG. 1, a notebook computer system 10 is shown, into which a user enters notes 20 and 30 and graphics 40, typically onto a screen 50 by use of a computer "pen" 60. The system 10 may utilize any of a variety of available pen-based computer technologies, such as those used for PDA's (personal digital assistants), including the Newton PDA from Apple Computer, Inc. and the MagicLink PDA from Sony Corporation. The present invention may also be used in conjunction with more conventional notebook computers, i.e. those where the text and graphics are entered by means of a mouse and keyboard.

Figure 1A:
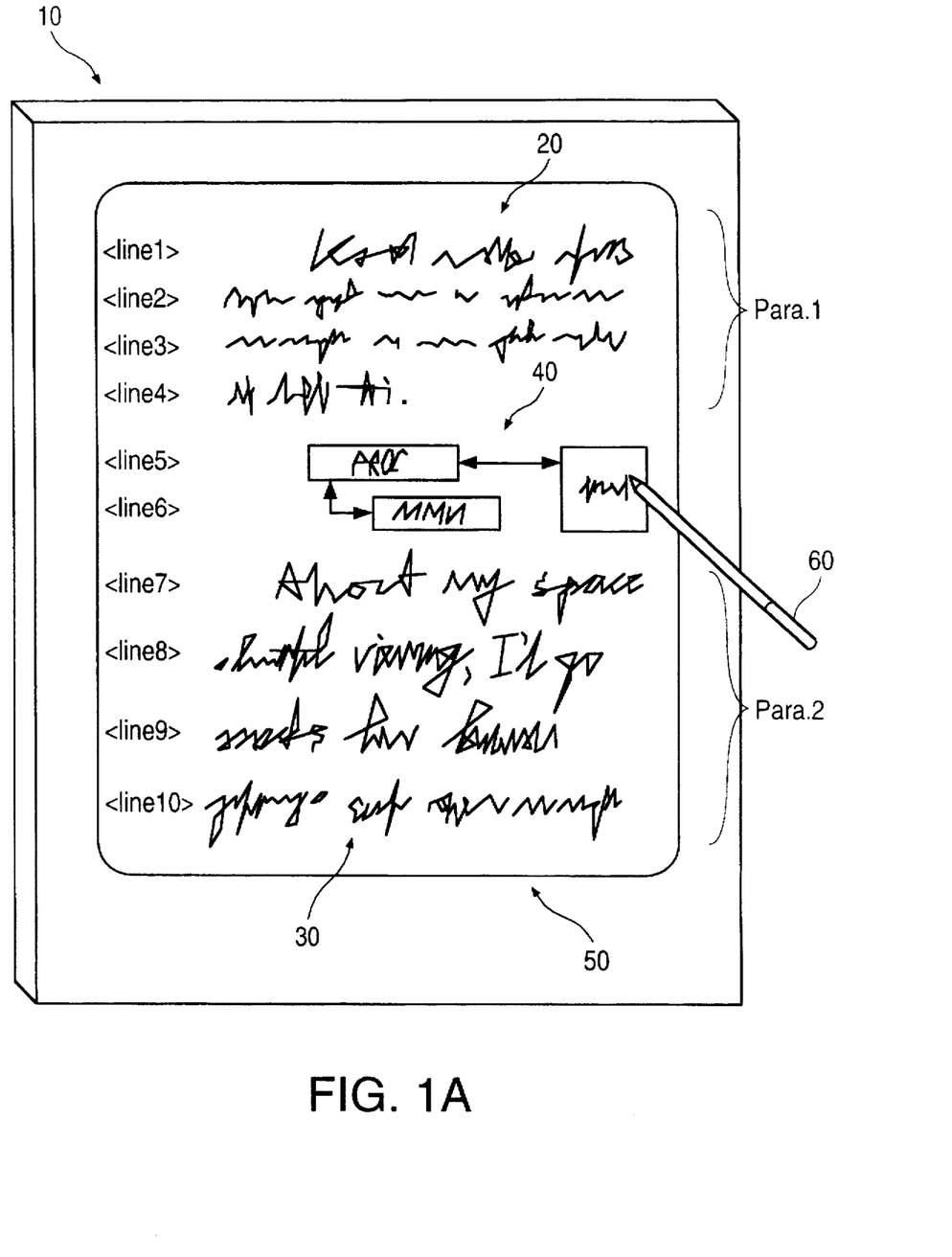
FIG. 1A is an illustration like FIG. 1, with lines and paragraphs identified.

FIG. 1A identifies subportions of the writing and graphics of FIG. 1, showing that in this example there are ten lines (<line 1>through<line10>) of entered data, comprising two paragraphs of text (Para.1 and Para.2, corresponding to text blocks 20 and 30, respectively) and one "paragraph" of graphics, i.e. graphics block 40. Graphic 40 may be considered to correspond to two lines of text: <line5> and <line6>.

Figure 2:
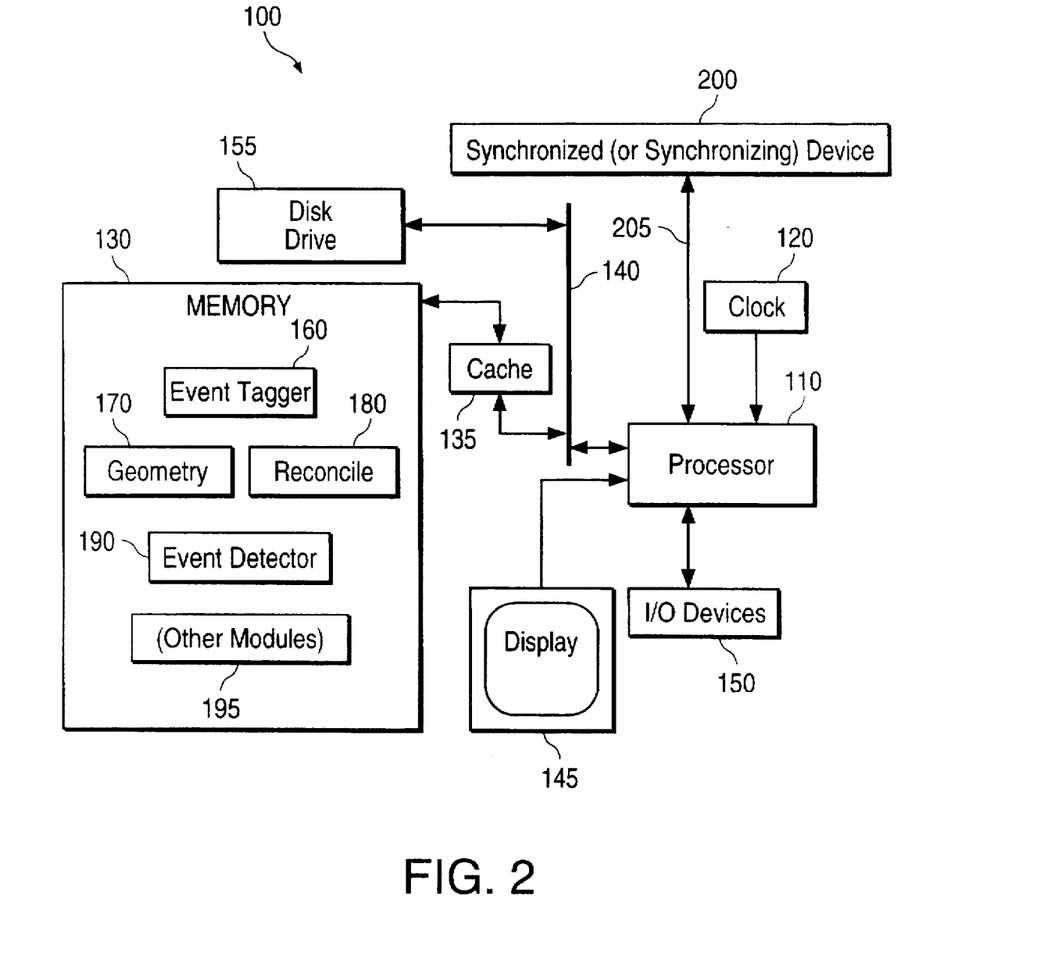
FIG. 2 is a block diagram of a computer system implementing the features of the present invention.

FIG. 2 shows a suitable architecture for the system 100 of the invention, including a processor 110 coupled to a clock 120 and to a memory 130 via a cache 135 on a memory bus 140, as well as a display 145 and other input and output devices 150. A disk drive 155 or other mass storage device is also connected to the processor 110 via the memory bus 140.

The display 145 may be a computer screen, a printer or other conventional output device. The input and output devices 150 may include a keyboard, a mouse, a computer pen, a touchscreen, and/or other conventional devices.

Stored in the memory 130 are instruction modules 160–195, which provide instructions to the processor 110 to carry out the method of the invention. As will be appreciated in the following discussion, the procedures of the method of the invention may be implemented in either hardware or software, but a most portable design may be arrived at by an implementation consisting primarily of software modules stored in the memory 130, so that conventional hardware need not be modified to realize the invention.

Thus, for each of the procedures described below, a software module may be provided as part of an overall application executed by the processor 110, which may itself be a single application stored on a disk or other computer-readable medium (such as a floppy disk or CD-ROM), and loadable into the memory via a disk drive (not separately shown). Alternatively, it may be an application available to the system 100 via a network connection. It may as another alternative comprise several applications the operate in conjunction with one another to perform the method of the invention.

Figure 3:
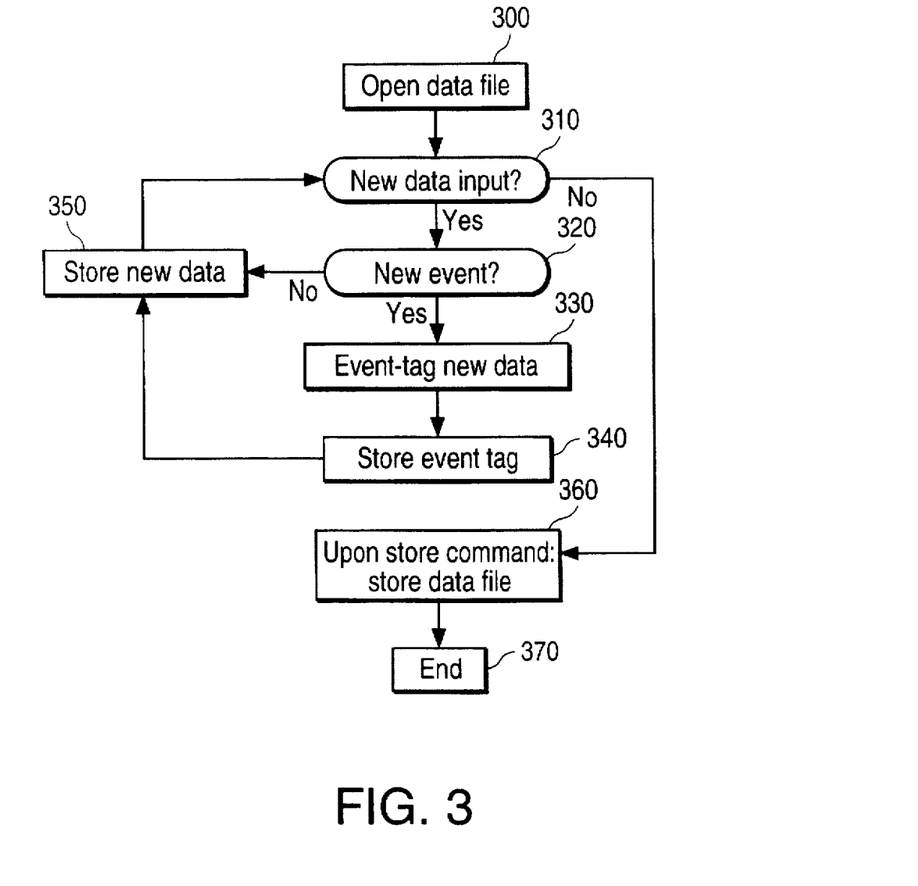
FIGS. 3 is a flow chart of the method of storing event-tagged data according to the invention.

FIG. 3 illustrates the general method of the invention for event-tagging elements or segments of a data file as they are entered by a user. Specific implementations of the general implementation are described in further detail in connection with FIGS. 4–9.

At box 300 of FIG. 3, a data file is opened by the user in a conventional fashion. At box 310, the system determines whether there has been any new input by the user. This may be by detecting a keystroke, a pen or touchscreen input, an audio or video input, or other inputs to the system.

If a new such input is detected, the method proceeds to step 320, where the system determines by means of an event-detector module 190 (see FIG. 2) whether a new event has occurred, as predefined in the module. An "event" may be any predetermined occurrence by which the user or programmer wishes to identify segments or portions of the data file that will be stored when all desired data has been entered. Examples of useful event definitions are: regular intervals of time; lines or paragraphs of text; graphical objects or drawings; regularly spaced portions of pages of the data file; manually selected portions of the data file; and any other manner of defining portions of the data file that the user finds convenient to access at a later time. Any of these may be used in combination with one another.

If a new event has occurred, then the method proceeds to boxes 330–340, where an event marker or tag is generated and stored, correlated with the data currently being entered. Preferably, a new event of some type is defined as beginning upon the opening or creating of a file.

At box 350, the newly entered data is also stored. Then at box 310, the system determines whether there is new data being input; if so, then the method proceeds to box 320, where it is again determined whether a new event has occurred. If not, then the method proceeds to box 350 to store the newly entered data and again to box 310. Thus, the loop 310–320–350 is followed as long as data is being entered but no predefined event occurs.

When a new event does occur, then at box 330 this new event is also tagged, and at box 340 it is stored, correlated with the data that is presently being entered. That is, the data itself is also preferably stored in the same data structure as its corresponding event tags, though it may alternatively be separately stored, with a pointer or link provided to it from the event tag data structure.

When no new data is being input, which can be flagged by a time-out or by a user or process-issued command, a user command, then the method proceeds from box 310 to box 360, where the data file is stored upon a store command (which may be entered by the user or automatically executed by the application). The method ends at box 370.

Thus, as a result of the foregoing procedure, each event is tagged with a predefined tag, which is correlated with the data that was entered between the commencement of one event and the commencement of the next. The complete file is stored in this manner.

The events may either follow or lead the particular blocks of data with which they are correlated. That is, a first event may be stored, and the data entered thereafter (up until the second event occurs) may be correlated with either the first event or the second event. Preferably, the first event is selected for this correlation, especially when user-defined events (such as blocks of graphics) are selected or when spatial events (such as paragraphs, pages, or page quadrants) are being used; however, for temporal events (time-tagging) it makes less difference whether the event correlation is leading or lagging.

Figure 4:
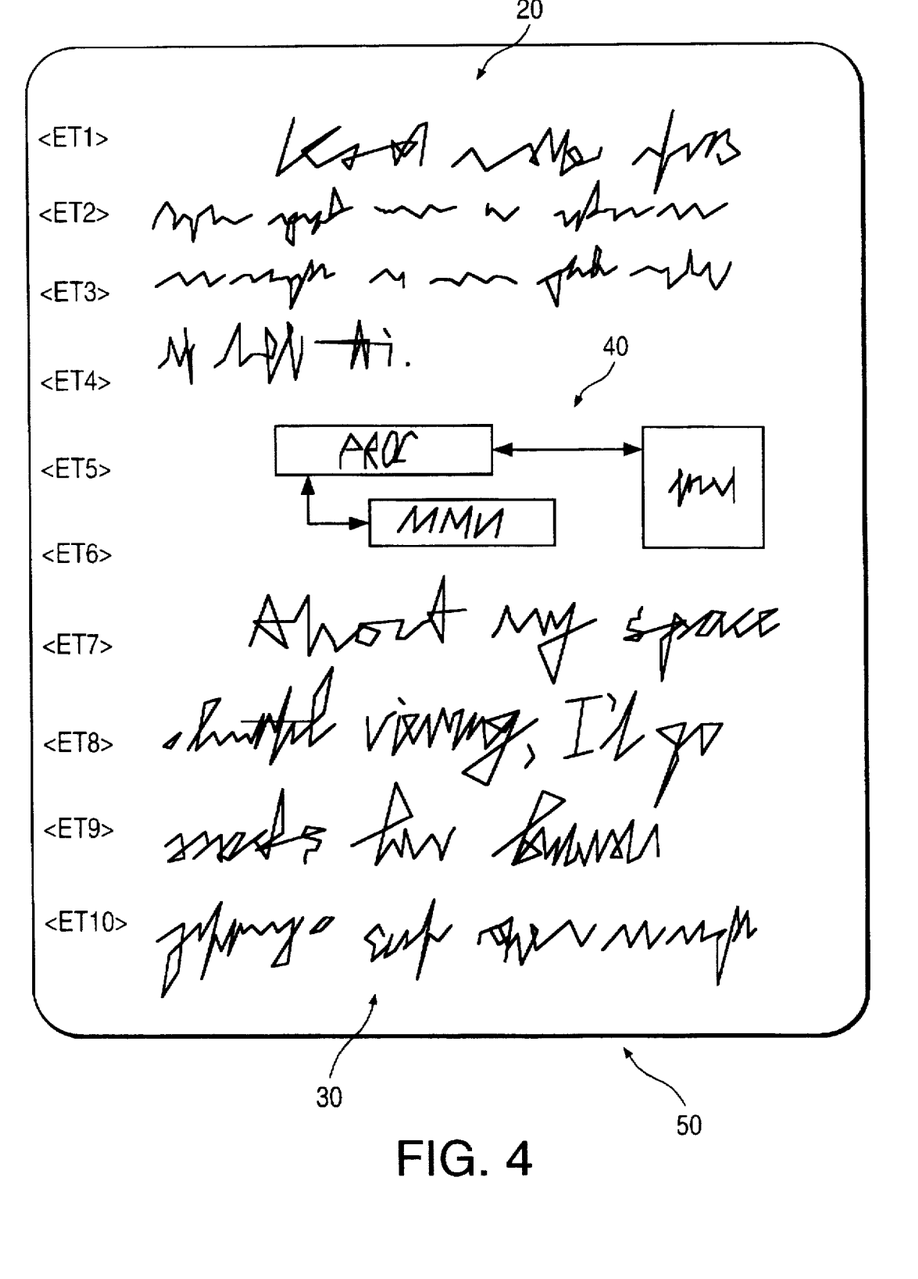
FIGS. 4–7 are diagrams showing different manners of implementing the present invention with time-based tags and other types of tags correlated with data segments in data files.

FIG. 4 shows resulting correlations between event tags ET1–ET10 and data 20–30–40 entered by the user. The predefined events that would result in such a correlation could be line detection, i.e. the detection by the system every time the user begins entering data on a new line. A new line may be defined as either a spatially defined vertical distance (which may itself be variable), or by the entry by the user of new information on the left edge of the screen 50, or some combination of these.

The correlation of FIG. 4 could also result from the definition of an event as some predetermined length of time, such as every 10 seconds or every minute, etc. In general, in this case the event tags E1–E10 will be unevenly spaced, since people do not necessarily write at an even rate, particularly when taking notes, and drawings such as graphic 40 tend to take longer. In either case, with either spatially or temporally based event definitions, event tags will not necessarily be entered in order from top to bottom in the document, since in general users will go back and make further notations or changes to drawings which have been entered earlier.

Figure 5:
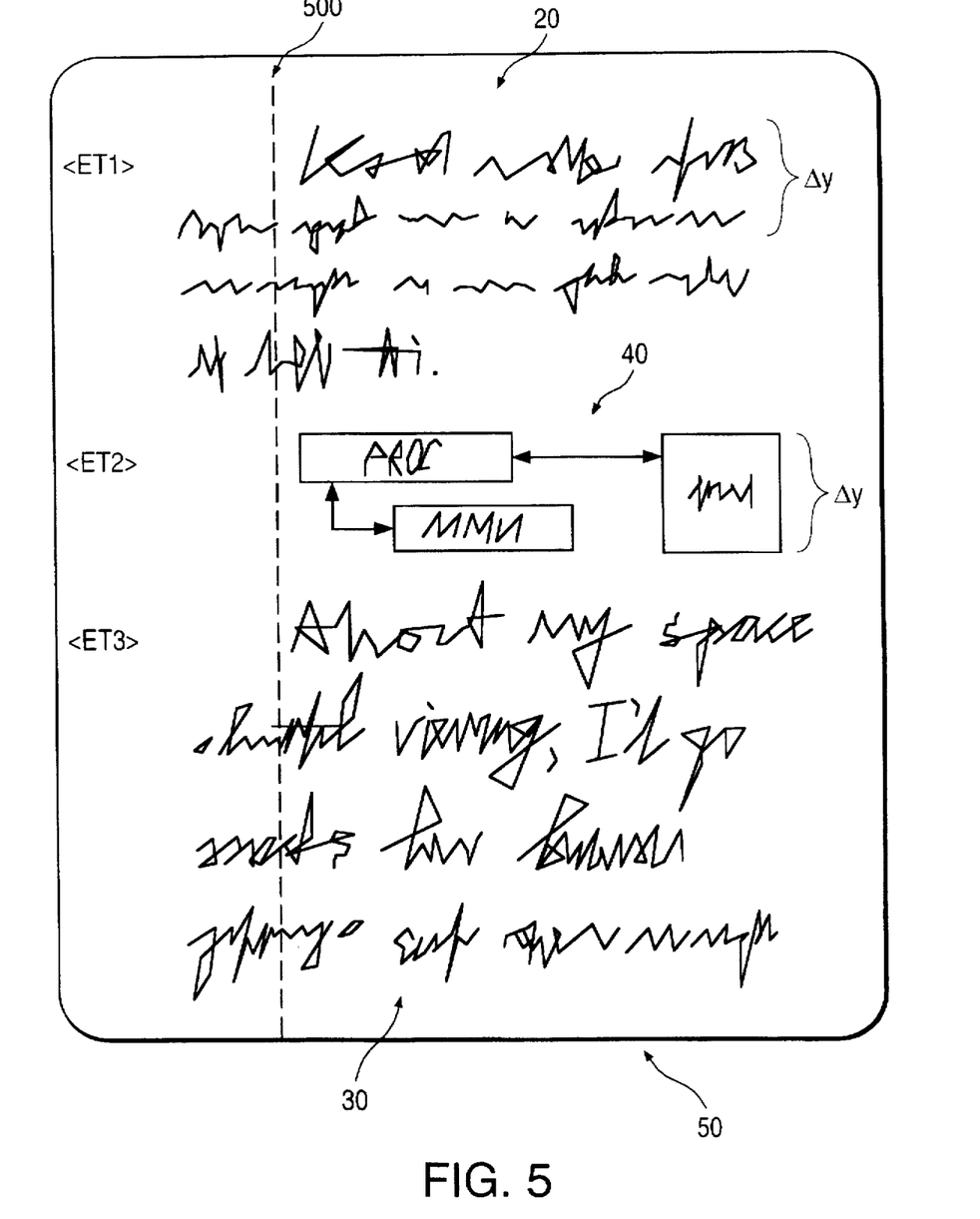

FIG. 5 illustrates the result of a different basis for event tagging, namely paragraph detection. In this version, the system detects whenever the user begins a new line of the document to the right of a predefined (not necessarily displayed) line or region 500. Thus, the indentation indicates to the system that a new paragraph is intended, and this is tagged as an event, correlated with the succeeding block of data. A minimum height Ay may be defined such that a paragraph will not be tagged unless it is at least, e.g., two lines long.

Note that in FIG. 5 the graphic 40 is tagged as a paragraph, though it is not primarily textual data. The efficacy of event tagging does not depend upon the actual content of the block of data identified as a paragraph or other event.

Figure 6:
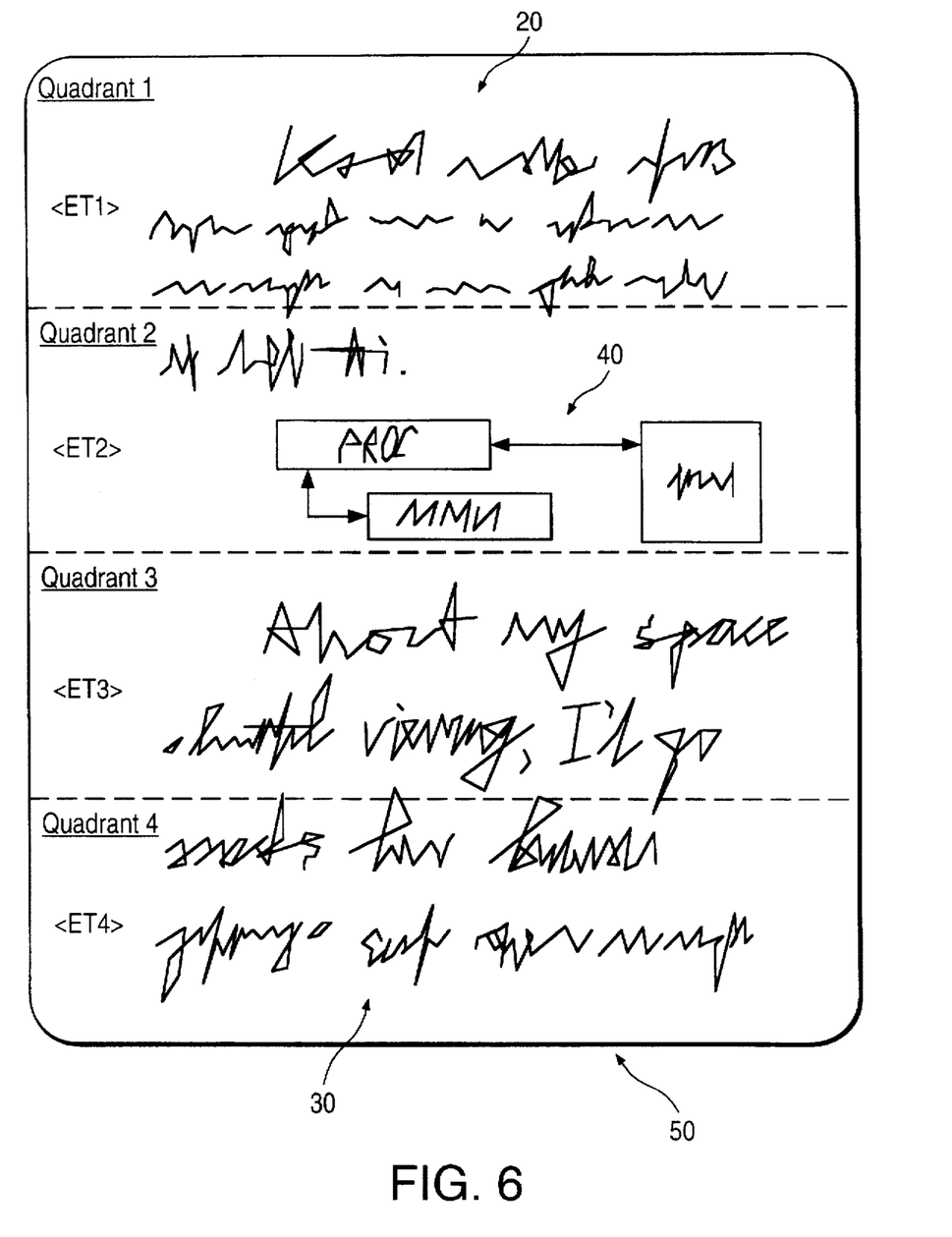

FIG. 6 shows the result of using regular spacing intervals as a basis for event tagging, in this example defining four quadrants per page of input data. This is useful when one wants to minimize the amount of file space devoted to tagging—since line-by-line or minute-by-minute tagging may generate many more tags—and additionally provides a spatially intuitive tagging scheme. Note that text or handwriting block 20, which was assigned a single event tag (ET1) in FIG. 5, now is split up, with a portion correlated with ET1 (FIG. 6) and a portion correlated, along with graphic 40, with ET2 (FIG. 6). Likewise, data block 30 is correlated in FIG. 6 with two different event tags, ET3 and ET4, since it appears in both quadrant 3 and quadrant 4.

Figure 7:
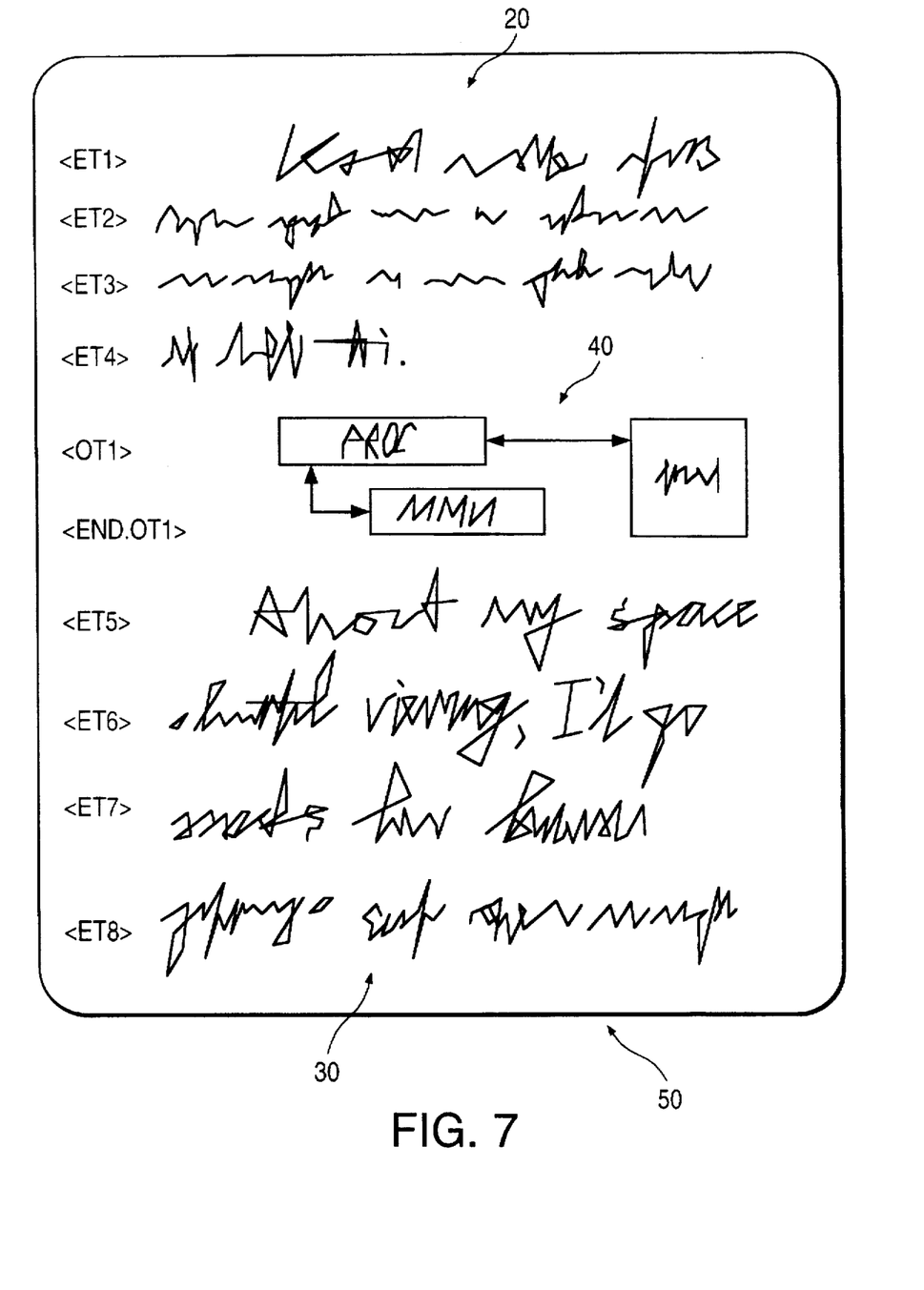

FIG. 7 illustrates a hybrid form of event tagging, using both the spatially or temporally defined event tags of FIG. 4 plus graphical or user-selected tag OT1. Tag OT1 may be regarded as an "object tag", and in this case may be based upon the entry by the user into graphics mode of the data entry application (e.g. word processing or handwritten note entry program) in use, or switching from one data entry application to another. This signals the beginning of a new event, and the object tag is stored along with the newly entered data. An ending tag END.OT1 may be stored when the user returns to the original mode or application.

In general, when one type of data entry is different from the type of data entry immediately preceding—which is generally the case when one changes applications or enters a graphics object into a text document or handwritten document, for instance—it is preferably to identify the new entry as a new type of data segment. Thus, as a general matter adjacent blocks of data that are of a different type from one another will be separately event-tagged data segments.

Tag END.OT1 may be a separately stored end tag, or may simply be the beginning of the next tag, in this case ET5 in FIG. 7. In general, the end of any event tag may be defined by the beginning of, or a pointer to, the next.

Tag OT1 may also be entered by the user; thus, the user may activate a predefined function that begins a new event, such as a particular stroke entered on the screen 50, a menu choice, or a hardware button on the computer 10. The end of the event may similarly be selected by the user, or may occur automatically as noted before, upon the commencement of a new event defined in some other manner (such as the entry of handwritten notes), by a time-out, or by some other predetermined process.

In either case, the user or the application is enabled to isolate the graphic 40 as a singly tagged event, which is useful for later reconciliation of the document or comparison of versions of the document as modified by different users.

Note that the quadrants of FIG. 6 are in a sense predefined (and fixed-size) events, since there will be a certain number per page independent of the contents of the data file. Events based upon regular time intervals are also content-independent, and thus in a similar sense predefined events. Events defined by lines, paragraphs or user selection are content- or context- (in the case of user selection) based, and are generated in the course of, and as a response to, data entry. Content- or context-based (or mode-based) events may be referred to as data-dependent events, while other events will be data-independent. Data-dependent and data-independent events will have differing usefulness in different settings, and may be selected by the user or programmer as appropriate, even at different times within a single document (as in the case of selecting object tags in FIG. 7, where other events in the document may be line-based or time-based).

Figure 8:
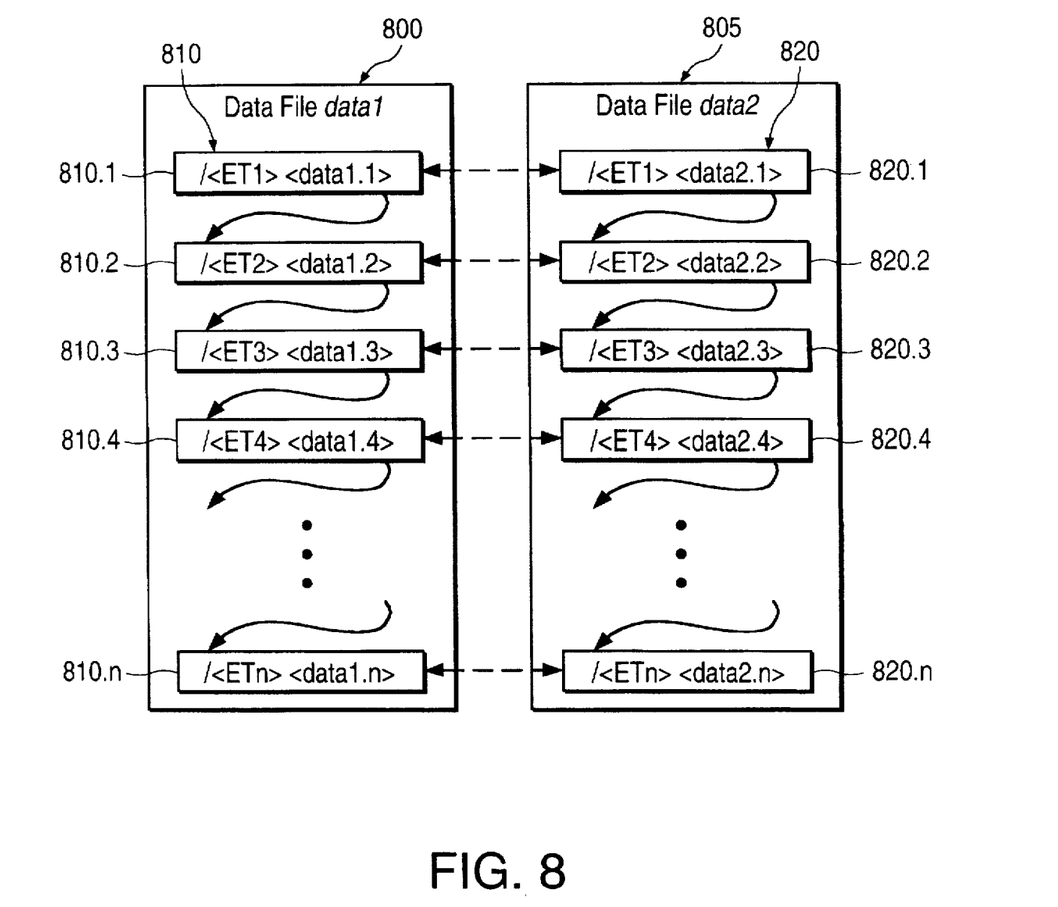
FIGS. 8 and 9 are diagrams illustrating linked lists of data used in the preferred embodiment of the invention.

FIG. 8 shows a suitable data structure for storing the event tags correlated with the data-determined or predefined segments of data. For a given data file 800 ("data1"), a linked list data structure 810 may be used. The data structure 810 includes n segments 810.1–810.n, each of which includes at least one field for an event tag and at least one data field. If desired, more than one event tag may be included for a given segment, so that document comparison or reconciliation may be based upon more than one type of event criterion. Multiple data fields may be used, such as for multiple lines of text or writing within a given segment or different data types within a segment.

Segment 810.1 corresponds to the first event-defined segment in data file 800. In any of FIGS. 4–7, this would be the event corresponding to event tag ET1. Likewise, segments 810.2–810.4 are tagged by event tags ET2–ET4.

Segment 810.1 is linked as indicated by the arrow in FIG. 8 to the next segment 810.2, and so on throughout the structure, until the last segment 810.n. Thus, the data file may easily be traversed from beginning to end by using the links (or pointers) from one segment to the next. On the other hand, the different segments may be treated as different objects for various purposes, as needed.

If the date file 800 is modified, a new data file 805 ("data2") is stored, having data structure 820 including a linked list of segments 820.1–820.n. With simple modifications to the data file 800, the structure of data file 805 will correspond exactly to that of data file 800, and the segments 820.1–820.n will correspond to segments 810.1–810.n on a one-to one basis.

However, some modifications may lead to the definition of new segments, such that some segments in the modified data file may have no corresponding segments in the original file, and some may end up corresponding to more than one original segment. Thus, in FIG. 9, data file 815 ("data3") represents a further modified version of data file 800, with data structure 830 including segments 830.1–830.o. Here, the data has been modified so that segments 830.b and 830.(b+1) together correspond to original segment 830.a. This could occur if, for example, a single paragraph were made into two paragraphs, or if a graphical object were split into two objects, or simply if a certain block of text in the modified version runs into the next quadrant (for example, in the embodiment of FIG. 6).

Figure 9:
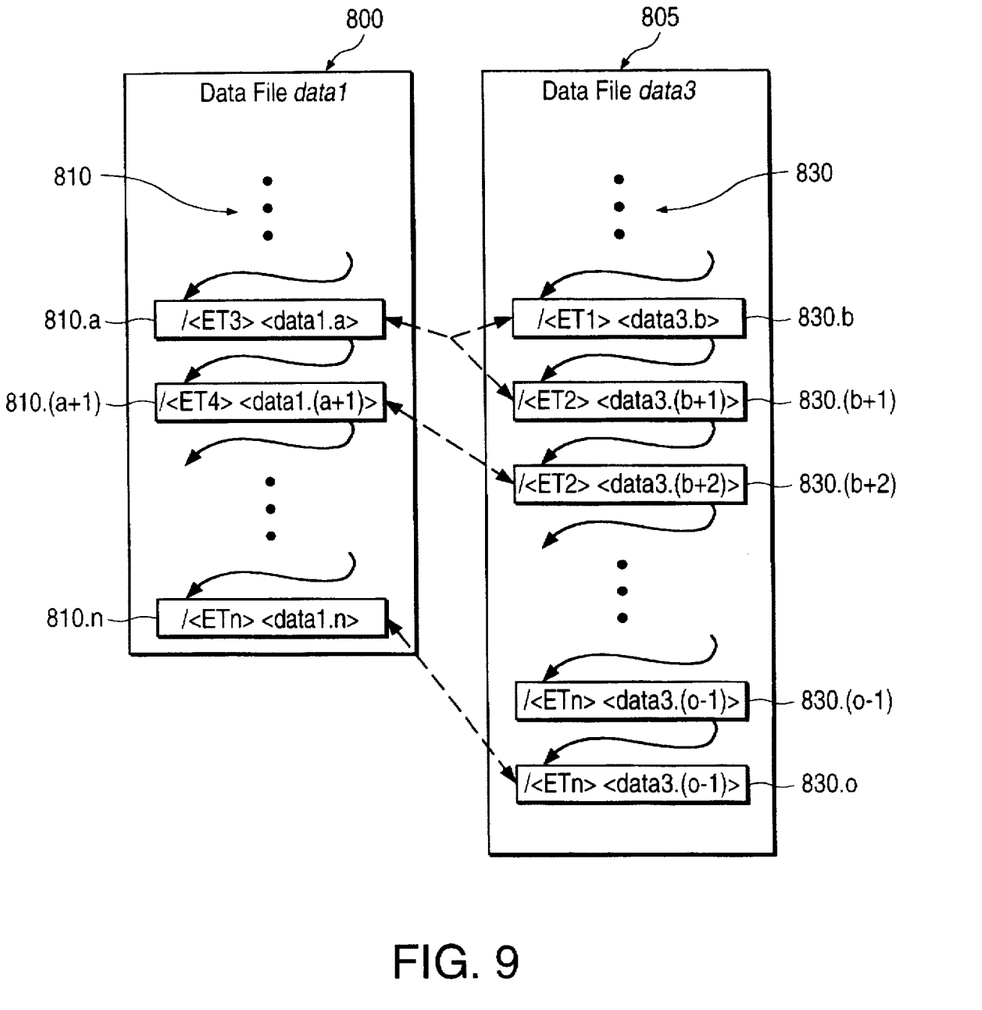

Data file 815 also includes a segment 830.(o–1) which has no corresponding segment in the original file. This may happen when new text or graphics are added to a document. Likewise, as segments are deleted from the document, the original file 810 will include segments not present in the modified document 815.

Figure 10:
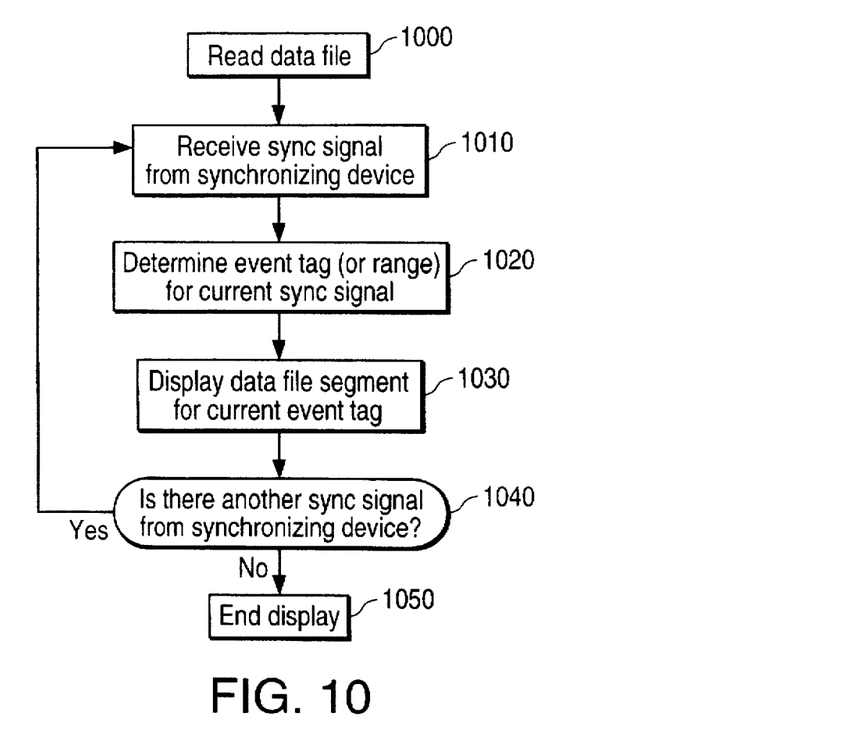
FIGS. 10–12 are flow charts illustrating methods of using the event-tagged data files according to the invention for synchronized document reconstruction and data file reconciliation.
Figure 11:
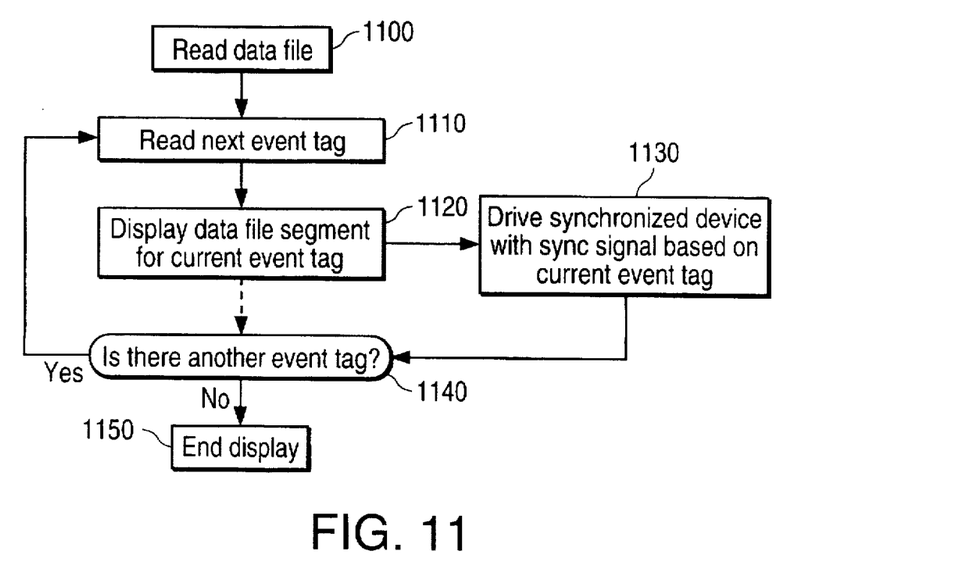
Figure 12:
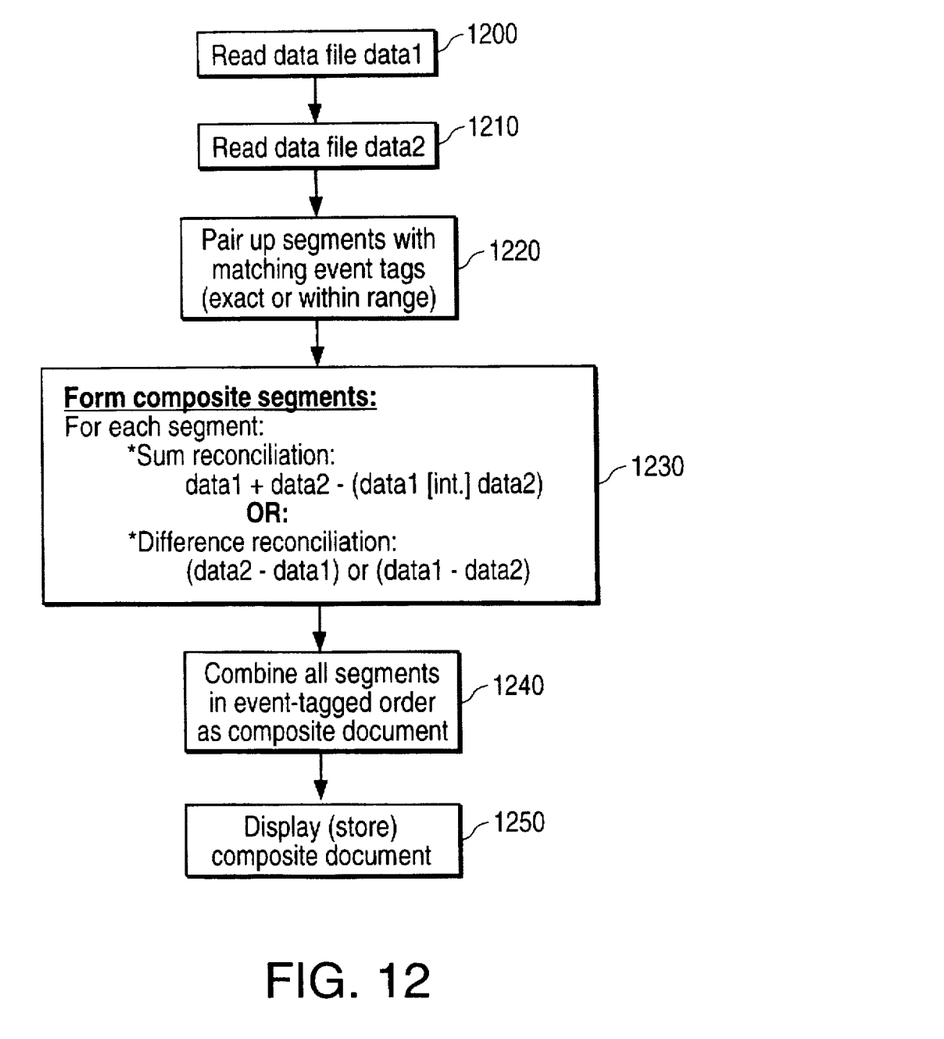

The flow charts of FIGS. 10–12 show various methods of using the data structures of FIGS. 8–9, putting the event-tagged data files to use in different situations.

FIG. 10 shows a method of displaying the event-tagged data, such as data structure 800, in synchronization with the playback of a series of time-encoded (or otherwise segment-encoded) signals. For instance, device 200 in FIG. 2 might be a video cassette recorder (VCR) or a digital audio tape (DAT) recorder, both of which conventionally time encode the signals constituting the recording of an event.

If a user has both recorded (or videorecorded) a meeting and taken notes on his or her notebook computer, then the present invention provides an efficient and effortless way correlate the notes file and the playback of the recording. At box 1000 in FIG. 11, the processor 110 (see FIG. 2) reads the data file into memory 130, e.g. data file 800 (see FIG. 8), and also fetches a portion of it into cache memory 135. At the same time, the processor commences playback of the tape in the tape player (device 200), or playback may be started manually by the user.

The tape player may be a conventional VCR, DAT or other machine that reads or generates a time signal correlated with the recorded signals, and this time signal is output to the processor via line or bus 205, as indicated at box 1010 in FIG. 11. At box 1020, the processor then determines the segment(s) in the data file 800 that correspond(s) to the current time signal, i.e. uses the tape player time signal as a synchronization (sync) signal vis-a-vis the data file.

At box 1030, the processor retrieves and displays the data file segment corresponding to current sync signal. Because the data file is already in memory 130, this can be quite fast, and upcoming segments can be prefetched from memory 130 into cache 135 as or before they are needed.

The method then determines, at box 1040, whether there is another sync signal from the tape player, and if so proceeds to box 1010 to receive it, and again through boxes 1020–1030 to display the segment(s) corresponding to the received signal. When the last sync signal is received, the method proceeds to box 1050, and no further segments are displayed.

Using this procedure, one can review, e.g., a videotape of a meeting, and simultaneously have the relevant portions of note displayed in real time and synchronized with the videotape, to bring the notes and diagrams into the context of the presentation or discussion at the meeting.

Instead of displaying the data file segments as specified at box 1030, a module may be provided with a routine for combining the audio and/or video from the tape player with the notes and/or graphics from the stored data file into a single, combined document that reflects all the recorded events from the meeting. Thus, the notes and drawings made by one attending the meeting can be stored as video in a combined video signal, in picture-in-picture fashion, and output by the processor to a second VCR (not separately shown) for recording. Alternatively, the taped signals and data file can be combined into a single data file. Thus, wherever "display" is indicated in the present invention, these variations are also possible.

FIG. 11 depicts a method for simply playing back the sequence of events stored in the data file, and/or for using the playback to drive another device, such as a VCR or DAT machine, synchronized with the segment playback from the data file. At box 1100, the processor reads the data file (the same as in box 1000 of FIG. 10), and at box 1110 the processor reads the next event tag from the data file. (On the first pass through box 1110, the "next" event tag will be the first event tag.) The segment corresponding to that event tag is displayed at box 1120.

If a tape player or other such device 200 is being used, then at box 1130 it is driven to play back or display its signals corresponding to the current segment, using the time stamp of the event tag to synchronize with the tape signal. In this embodiment, it is preferable if all segments are time-stamped even if their particular event tags are not timebased; i.e. all event tags should have time signals stored with them, for optimal use of this embodiment.

At box 1140, the processor determines whether there is another event tag in this data file, and if so the method proceeds to box 1110. The loop of boxes 1110–1140 is repeated until the end of the data file is reached.

Using this procedure, one can commence playback of a series of notes and drawings from a data file, and automatically drive a recording of the live events corresponding to the notes and drawings. Thus, one can watch the notes evolve as the recording progresses, and pause or stop at any time to study them, and later resume. This closely approximates the real-life setting in which the notes were generated.

If there is no synchronized device to be driven by the system, then in FIG. 11 the method proceeds directly from box 1120 to box 1140, as indicated by the dotted arrow. In this case, the notes and drawings still are presented to the user as they evolved, but no accompanying audio or video playback is present. This alone is quite useful, especially in the viewing of drawings as they are made; in effect, the drawings are animated for the user.

If the input data file in FIG. 11 is data file 805 or 815 (i.e. a modification of the original), then new segments will appear in the order they were generated in the modified document. In addition, the data structures of FIGS. 8–9 may be modified such that all modified segments appear as later event-tagged segments, i.e. at the end of the data structures. In this case, the order of modifications is scrupulously preserved, and the evolution of the modifications can viewed segment by segment.

In FIG. 11, an application executing on the processor is preferably provided for generating the event-driven display of the data file segments. In this way, the method of FIG. 11 is similar to that of FIG. 10; both use a series of signals (in FIG. 10, sync signals; in FIG. 11, signals from an executing process) to drive the display of the data file, segment by segment.

FIG. 12 shows a method for reconciling different versions of a data file (such as data files 800, 805 and 815 in FIGS. 8–9). At box 1200, the data file 800 is read (just as at boxes 1000 and 1100 in FIGS. 10 and 11, respectively), and at box 1210, data file 805 (or 815) is read. At box 1220, the corresponding segments are matched up by their event tags, as illustrated in the diagram of FIG. 8.

At box 1230, a reconcile module 180 (see FIG. 1) combines the segments from the original data file 800 and the modified data file 805 to form composite segments. This may be done in a number of ways, such as by a sum (additive) reconciliation or a difference (subtraction) reconciliation. In a sum reconciliation, for each segment of data file 800 the data in that segment is combined with the data in the corresponding segment of data file 805 additively; in order not to include the same data twice, the intersection of the two sets of data forming the two segments is excluded (since it is already included from one of the segments, it need not be included from the other).

This type of reconciliation is particularly useful where it is known that two persons have independently added material to an original data file; in this case, both of their contributions appear, and material that is deleted by one is excluded only if it has also been deleted by the other.

In a difference reconciliation, the data in the segments in one data file are subtracted from the data in the corresponding segments from the other data file; either data file may be the subtracter or the subtractee. This approach is useful if one wishes to determine how much information has been added to a file when it was modified (in this case, the data in segments from data file 800 are subtracted from the data in segments from data file 805). On the other hand, one may wish to determine how much information has been deleted from the data file; in this case, the data in segments from data file 805 are subtracted from the data in segments from data file 800.

Other reconciliation schemes are readily usable with the present invention. There are numerous commercially available applications with built-in routines for comparing document versions with one another, and procedures such as those used conventionally today may readily be used in the present invention. The system of the invention provides a convenient and efficient way of event-tagging to facilitate document reconciliation and synchronization, and to display or store the evolutionary development of such documents, which systems known to applicant lack.

Whichever reconciliation approach is used, at box 1240 the combined segments are stored (including, if desired, in a buffer for output to a display) in event-tagged order as a composite document. The composite document is displayed at box 1250 (or simply stored on disk drive 155 in FIG. 2, or on anther mass storage device).

In any of the above examples, the event tags can be displayed and/or stored with each segment of the data files, whether the original version, a modified version, or a combined original/modified of the data file is being displayed or stored. This preserves the developmental history of the document, and in each case provides an efficient mechanism for synchronization with independent recordings of proceedings occurring while the user makes his or her notes. It will be noted that the data files can be used to generate a time-or event-based history of the document, or external time signals (or event signals) can be used to drive display of the development of the document.

This latter feature also makes it possible to identify or determine, for instance, all notes or drawings made in a certain time interval. Since one tends to skip around when making notes, e.g. to go back and add something to a drawing, it can be quite helpful to isolate all portions of a stored document that correspond to a particular time period, such as a particular five minutes of a videotape.

A variation on this system can be had where an event is generated each time a user touches the document; i.e., each time the user physically touches a pen-driven screen with the pen, perhaps after a given minimum time where no pen contact has been made, then an event tag may be stored even if no modification is made as a result of the pen contact. (Thus, a physical touch also results in a "touch" in the UNIX sense, i.e. an update of the modification time of the document.) This is useful, for instance, where a talk is being given, and the speaker refers to a particular drawing or portion of a document; at that moment, the user can touch the region referred to, generating an event tag, and later when the tape is played back the event tag will cause the reference drawing to be displayed at the correct time. Such "touches" are not confined to pen-based systems, but can be implemented for documents entered by keyboard, e.g. by providing a touch as a result of a mouse click or a menu choice.

It is also possible to store, as part of the event tags, the sources for the segments. This can be used to identify these sources when a composite document is displayed. In addition, in a multi-user setting, where a document can be interactively and in real time modified by several users (such as in an networked "whiteboard" system), the resulting document when stored will preserve information about who made which changes, on a userid or host id basis, or on the basis of user identifiers assigned by the shared whiteboard system. The document can be displayed or printed with the event tag information in full, so that the development of the document on a user-by-user basis is evident.

A variation on this can be achieved where several users are modifying a single document on a pen-driven screen, where each user's pen is equipped with a unique id, and the id information qualifies as an event (i.e. each new id entry triggers a new event), and is stored with the event tags. In this case, an interactive communication (at least in one direction, such as by radio signals) between the pen and the notebook computer is needed. It is a straightforward matter to encode a signal generator with user identifiers and to detect those identifiers at the notebook computer.

In any of the foregoing embodiments, as indicated, it is helpful to include with each event tag a time stamp, whether or not that event tag was triggered by a time-based event.

What is claimed is:

1. A method for event-tagging data entered into a first data file stored in a memory of a computer system that includes a processor coupled to the memory, the method carried out by program instructions executed on said processor and including the steps of:
   (1) receiving a plurality of new data entries;
   (2) determining whether each new data entry constitutes a predefined type of event, and if so then storing in the memory, correlated with each new data entry, an event tag identifying that new data entry as a data segment, where the predefined event is automatically generated by the computer system substantially at the time of the new data entry and includes at least a spatial region and a temporal event such that the spatial region is correlated with a time of occurrence of the new data entry; and
   (3) outputting the data entries on a segment-by-segment basis; wherein the data segment constitutes one of a plurality of data segments of a predetermined type stored sequentially in time.

2. The method of claim 1, wherein step 3 includes the step of:
   (4) driving the output of the data segments in response to a series of event signals.

3. The method of claim 2, wherein step 3 includes, before step 4, the step of receiving the series of event signals at the processor from an device external to the computer system.

4. The method of claim 3, wherein the external device is a playback device storing information corresponding to the predefined events.

5. The method of claim 2, wherein step 3 includes, before step 4, the step of generating the series of event signals in the processor.

6. The method of claim 5, further including the step of outputting the series of event signals to a device external to the computer system to drive playback of information corresponding to the predefined spatial regions in an order determined by the respective times of occurrence of the new data entries.

7. The method of claim 1, wherein at least one said event tag is an indicator of the time of the new data entry.

8. The method of claim 1, wherein at least one said event tag is an indicator of a predefined region on a data entry surface.

9. The method of claim 1, wherein at least one said event tag is an indicator of a first type of data different from a second type of data in an adjacent data segment.

10. The method of claim 1, including:
   (4) repeating steps 1–3 to modify the first data file, and storing the modified data file with new event-tagged data segments; and
   (5) correlating at least a first subset of the event-tagged data segments of the first data file with at least a second subset of the event-tagged data segments of the modified data file.

11. The method of claim 10, including, after step 5, the step of reconciling the first and second subsets of event-tagged data segments.

12. The method of claim 11, wherein the reconciliation step is carried out by an additive reconciliation.

13. The method of claim 11, wherein the reconciliation step is carried out by subtractive reconciliation.

14. A method for outputting information stored in a data file comprising event-tagged data segments, the data segments being defined according to event tagging generated automatically by a computer system according to a plurality of spatial regions and a plurality of data entry times such that each spatial region is correlated with a time of entry of data corresponding to that spatial region, the method including the steps of:

generating a series of signals corresponding to the event-tagged data segments; and in response to each said signal, outputting one said event-tagged data segment;

wherein a plurality of separately event-tagged data segments of a predetermined type are output sequentially in time.

15. The method of claim 14, wherein:

the data file is stored in a memory coupled to a processor of a computer system; and the series of signals is generated by a playback device storing information corresponding to the event-tagged data segments, and is communicated to the processor.

16. A computer system for storing new data entries into a data file, including:

a processor;

a memory coupled to the processor; and a plurality of program modules stored in said memory and configured to execute on said processor, including:

a data input module configured to receive the new data entries;

an event detector module configured to detect whether each new data entry relates to a predefined spatial region, and if so to tag the data entries so identified with an event tag identifying the data entries as data segments corresponding to the predefined spatial region, the event tags being correlated with respective times of entry of the data segments in respective spatial regions, wherein the predefined spatial region is automatically determined by the computer system; and a synchronization module configured to synchronize at least one of input and output of the data segments with a series of synchronization signals;

wherein a plurality of said data segments are of a predetermined type and are stored sequentially in time.

17. The system of claim 16, further including a receive module configured to receive said synchronization signals from a source external to the computer system.

18. A computer-readable medium storing a plurality of modules for storing new data entries in a data file stored in a memory of a computer system having a processor, including:

a data input module configured to instruct the processor to store the new data entries in the memory;

an event detector module configured to instruct the processor to determine whether each new data entry relates to a predefined type of region automatically determined by the computer system, and if so to tag the data entries so identified with an event tag identifying the data entries as data segments corresponding to the predefined type of region; and a synchronization module configured to instruct the processor to synchronize at least one of input and output of the data segments with a series of synchronization signals;

wherein a plurality of said data segments are of a predetermined type and are stored sequentially in time.

19. The medium of claim 18, further including a receive module configured to instruct the processor to receive said synchronization signals from a predetermined source.

20. The medium of claim 18, further including a send module configured to instruct the processor to output said synchronization signals to a predetermined device.

21. The medium of claim 18, wherein said predefined region is determined at least in part by a position of each new data entry.

22. The medium of claim 18, wherein said predefined event is defined at least in part by a position of each new entry on a page having predefined subpages of predetermined dimensions.

23. The medium of claim 22, wherein said subpage comprises a line of text.

24. The medium of claim 22, wherein said subpage comprises a quadrant of said page.

25. A method for inputting information to a data file stored in a computer system, including the steps of:

inputting a sequence of data segments into the computer system; and storing each said data segment, correlated with an event tag generated automatically by a computer system according to at least one predefined type of region;

wherein a plurality of separately event-tagged data segments of a predetermined type are input sequentially in time, and each data segment is stored in a manner correlated with its time of entry in its respective region.

* * * * *